(12) United States Patent
Kemp

(10) Patent No.: US 12,441,276 B2
(45) Date of Patent: Oct. 14, 2025

(54) VEHICLE WHEEL WELL HEATING SYSTEM

(71) Applicant: Austin Kemp, Kitchener (CA)

(72) Inventor: Austin Kemp, Kitchener (CA)

( * ) Notice: Subject to any disclaimer, the term of this patent is extended or adjusted under 35 U.S.C. 154(b) by 598 days.

(21) Appl. No.: 17/965,563

(22) Filed: Oct. 13, 2022

(65) Prior Publication Data

US 2024/0123947 A1    Apr. 18, 2024

(51) Int. Cl.
*B60S 1/68* (2006.01)
*B62D 25/18* (2006.01)
*H05B 3/36* (2006.01)

(52) U.S. Cl.
CPC .............. *B60S 1/68* (2013.01); *B62D 25/18* (2013.01); *H05B 3/36* (2013.01); *H05B 2214/02* (2013.01)

(58) Field of Classification Search
CPC ...... H05B 2214/02; H05B 3/36; B62D 25/18; B60S 1/66; B60S 1/68; B60R 3/00
USPC .................. 219/202; 280/163, 847; 296/198; 392/426
See application file for complete search history.

(56) References Cited

U.S. PATENT DOCUMENTS

| | | | |
|---|---|---|---|
| 7,731,373 B2 * | 6/2010 | Oskarsson | B32B 17/10036 219/203 |
| D703,446 S | 4/2014 | Roberts | |
| 10,343,722 B2 | 7/2019 | Faucett, Jr. | |
| 10,609,765 B2 | 3/2020 | Johnson | |
| 10,946,839 B2 | 3/2021 | Salter | |
| 2008/0083719 A1 | 4/2008 | Bartucco | |
| 2008/0296279 A1 | 12/2008 | Forrest | |
| 2016/0185199 A1 * | 6/2016 | Cook | H02S 40/38 150/166 |
| 2018/0093645 A1 | 4/2018 | Ochoa | |
| 2020/0164839 A1 | 5/2020 | Cook | |

FOREIGN PATENT DOCUMENTS

| | | | | |
|---|---|---|---|---|
| CA | 2276992 A1 * | 1/2000 | ............. | B62D 25/18 |
| CA | 3025597 | 5/2020 | | |

* cited by examiner

*Primary Examiner* — Vy T Nguyen

(57) ABSTRACT

A vehicle wheel well heating system for being actuated by a wireless device includes a vehicle transporting a user including a car body having a plurality wheel wells and a plurality of wheels being attached to the car body. Each of the wheels is positioned in one of the wheel wells and each of the wheel wells has one of a plurality of heating assemblies mounted therein. Each of the heating assemblies remotely actuates by a remotely positioned control and retains a temperature of an associated one of the wheel wells above 0° C. to inhibit snow and ice from building up in the wheel well and on a corresponding one of the wheels.

7 Claims, 4 Drawing Sheets

VEHICLE WHEEL WELL HEATING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wheel well heating devices and more particularly pertains to a new wheel well heating device for being actuatable by a wireless device.

(2) Description of Related Art Including Information Disclosed Under 37 CFR 1.97 and 1.98

The prior art relates to wheel well heating devices including a variety of devices configured for heating the wheel well of a vehicle. Known prior art lacks a transmitter being integrated within the device to actuate wirelessly by a wireless remote.

BRIEF SUMMARY OF THE INVENTION

An embodiment of the disclosure meets the needs presented above by generally comprising a vehicle configured for transporting a user may comprise a car body including a plurality wheel wells and a plurality of wheels coupled to the car body. Each of the wheels is positioned in one of the wheel wells and each of the wheel wells has one of a plurality of heating assemblies mounted therein. Each of the heating assemblies is configured for remotely actuating by a remotely positioned control and retaining a temperature of an associated one of the wheel wells above 0° C. to inhibit snow and ice from building up in the wheel well and on a corresponding one of the wheels.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
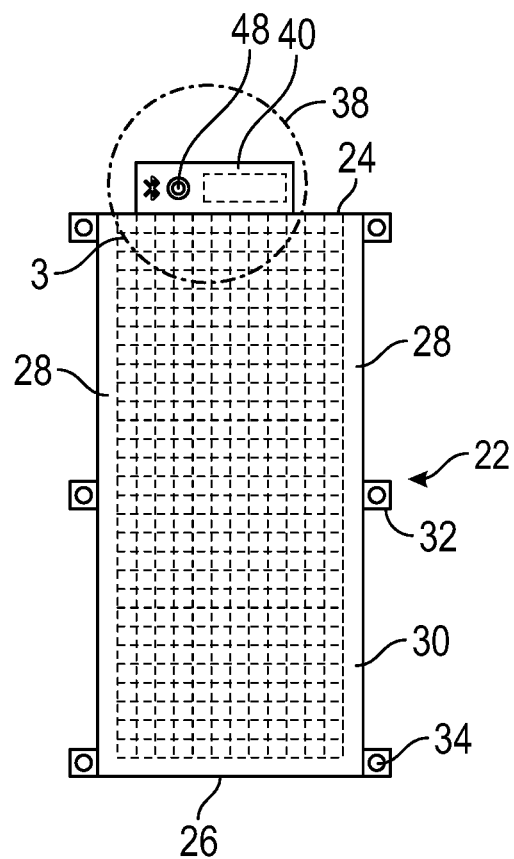
FIG. 1 is a front view of a vehicle wheel well heating system according to an embodiment of the disclosure.
Figure 2:
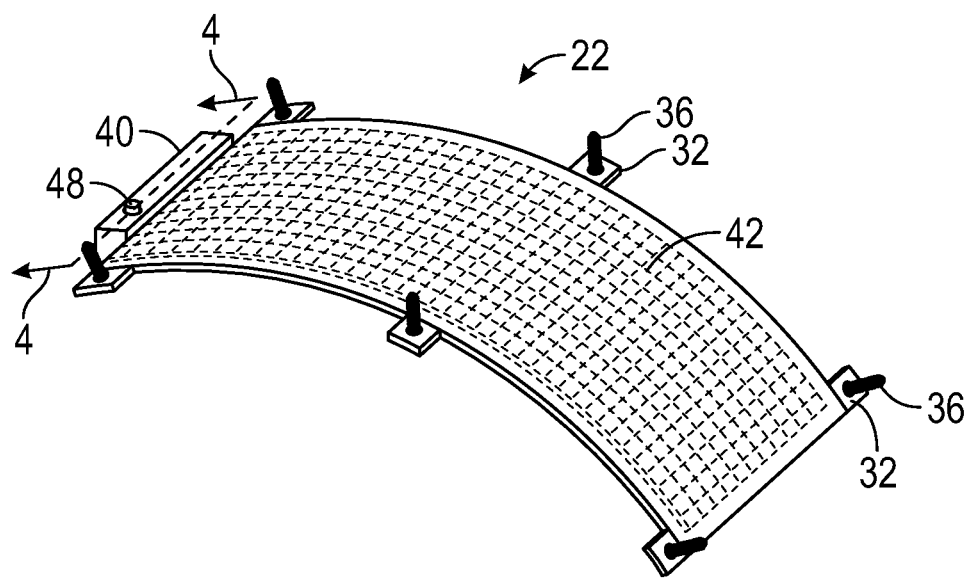
FIG. 2 is a perspective view of an embodiment of the disclosure.
Figure 3:
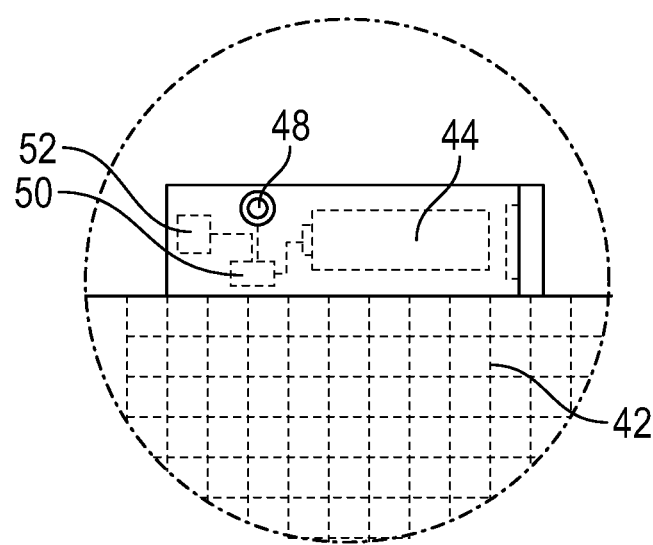
FIG. 3 is a detail view of an embodiment of the disclosure take from FIG. 1 of Magnified Circle 3.
Figure 4:
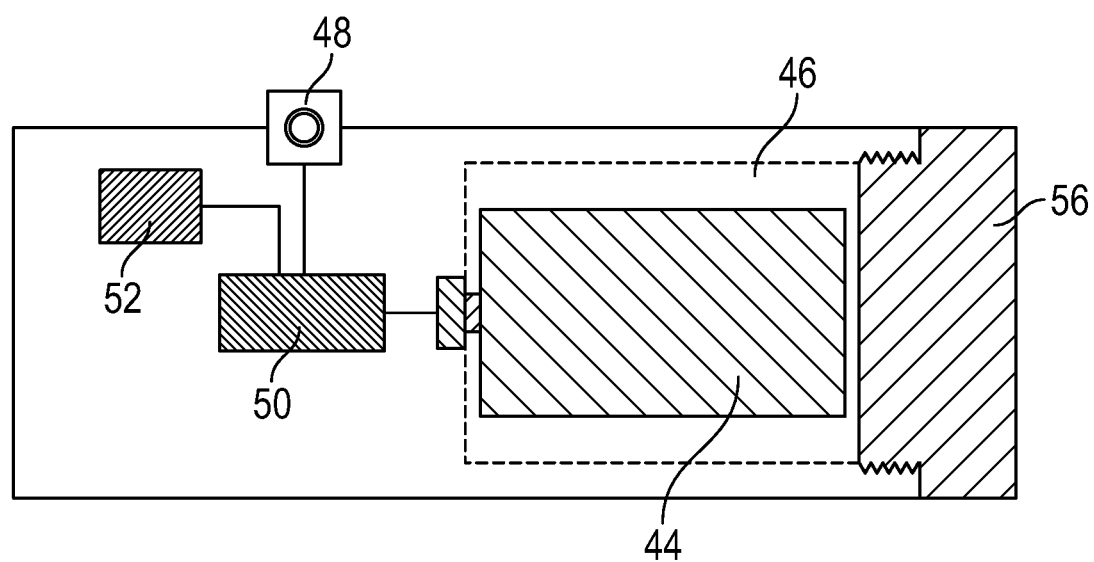
FIG. 4 is a cross-sectional view of an embodiment of the disclosure taken along Line 4-4 of FIG. 2.
Figure 5:
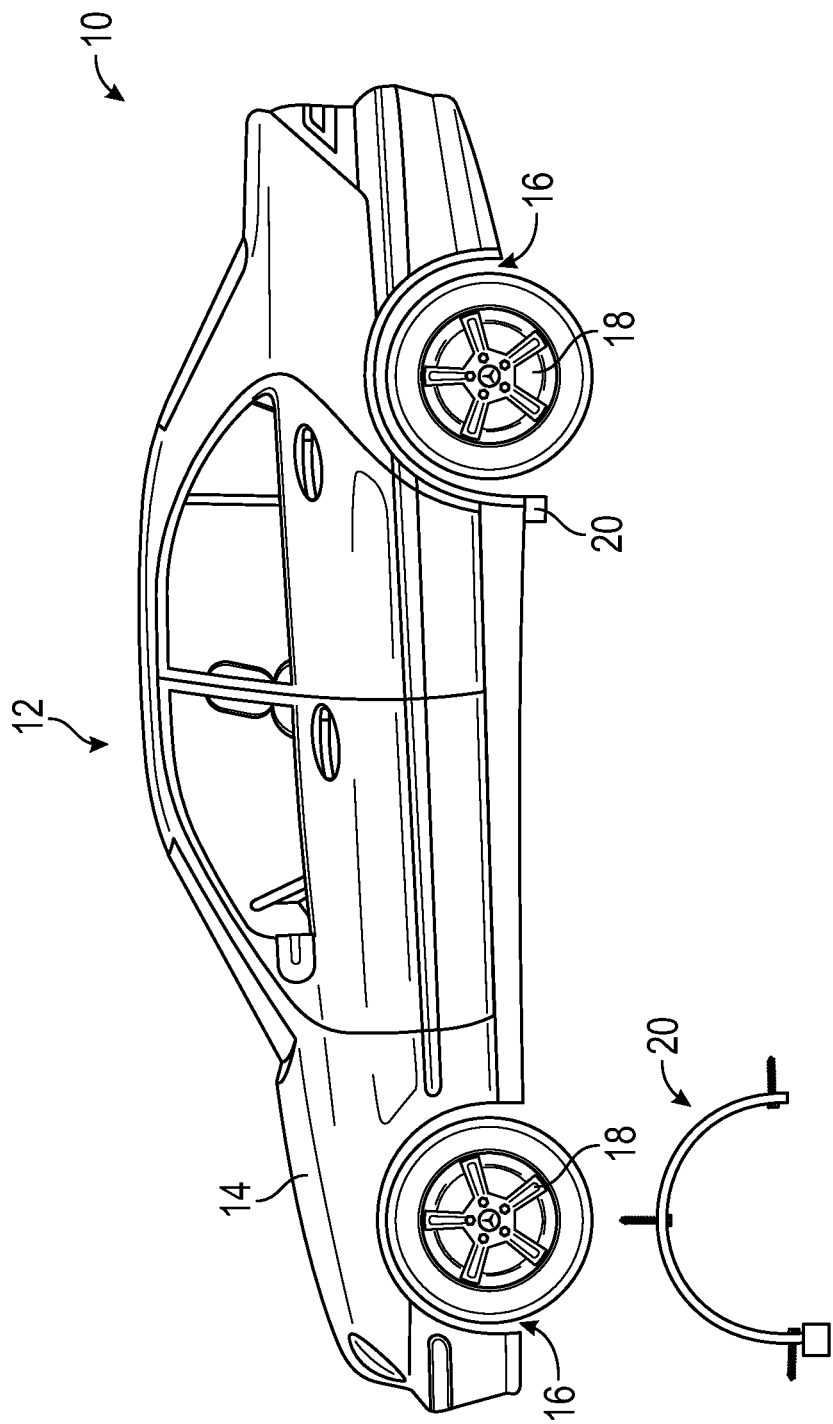
FIG. 5 is an in-use view of an embodiment of the disclosure.

With reference now to the drawings, and in particular to FIGS. 1 through 5 thereof, a new wheel well heating device embodying the principles and concepts of an embodiment of the disclosure and generally designated by the reference numeral 10 will be described.

As best illustrated in FIGS. 1 through 5, the vehicle wheel well heating system generally comprises a vehicle 12 configured for transporting a user. The vehicle 12 is conventional and will typically comprise a car body 14 including a plurality of wheel wells 16. The car body 14 includes a plurality of wheels 18 and each of the wheels 18 is positioned in one of the wheel wells 16. Each of the wheel wells 16 has one of a plurality of heating assemblies 20 mounted therein. Each of the heating assemblies 20 is configured to retain a temperature of an associated one of the wheel wells above 0° C. to inhibit snow and ice from building up in the wheel well 16 and on a corresponding one of the wheels 18. This temperature may be increased up to 4° C.

Each of the heating assemblies 20 includes a panel 22 being coupled to the associated one of the wheel wells 16 and being proximate to the corresponding one of the wheels 18. The panel 22 may have a rectangular shape including a first edge 24, a second edge 26, and a pair of side edges 28. The panel 22 may further comprise an elastomeric material 30 being liquid impermeable and resiliently bendable to conform to a shape of the corresponding wheel well 16. Each of the side edges 28 has at least two of a plurality of tabs 32 attached thereto and each of the tabs 32 has an aperture 34 extending therethrough. Each of the tabs 32 has one of a plurality of fasteners 36 extending therethrough and into the car body 14. Each of the fasteners 36 will typically comprise a screw insertable through the aperture 34 of each of the tabs 32. Alternatively, the panel 22 may be bonded to the wheel well 16 using conventional methods.

A heating apparatus 38 is coupled to the panel 22 and configured for melting ice and snow positioned upon the corresponding wheel 18. The heating apparatus 38 may comprise an exterior wall 40 being insulated. The heating apparatus 38 includes a heating element 42 being mounted within the panel 22. The heating element 42 may comprise copper mesh or another conductive material.

A power supply 44 is electrically coupled to the heating element 42. The power supply 44 comprises a battery being removably stored within a compartment 46 attached to the panel 22. An actuator 48 mounted on an exterior of the panel 22 is in electric communication with the power supply 44 and is configured for turning the heating element 42 on or off. A circuit board 50 is electrically coupled to the power supply 44 and the actuator 48. A transmitter 52 is electrically coupled to the circuit board 50 and is in wireless communication with a remotely positioned control 54 to remotely actuate the heating element 42. However, the heating element 42 may be turned on manually with the actuator 48.

In use, one of the heating assemblies 20 is mounted on each of the wheel wells 16 and secured thereto by the plurality of fasteners 36. The heating apparatus 38 may be actuated using the actuator 48 or by using the remotely positioned control 54 in wireless communication with the transmitter 52. The heating element 42 will then begin to continuously emit a temperature above 0° C. to melt ice and snow upon the wheels 18 of the car body 14 and prevent any more ice or snow from accumulating in the wheel wells 16. The power supply 44 is removed after being depleted of electricity by removing a cap 56 from the compartment 46 and replacing the battery.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle wheel well heating system comprising:
a vehicle configured for transporting a user, said vehicle comprising:
  a car body including a plurality wheel wells; and
  a plurality of wheels being coupled said car body, each of said wheels being positioned in one of said wheel wells; and
a plurality of heating assemblies, each of said wheel wells having one of said heating assemblies mounted therein, each of said heating assemblies being configured for remotely actuating by a remotely positioned control and retaining a temperature of an associated one of said wheel wells above 0° C. to inhibit snow and ice from building up in the wheel well and on a corresponding one of the wheels,
wherein each of the heating assemblies further includes a panel being coupled to the associated one of said wheel wells and being proximate to the corresponding one of said wheels,
a heating apparatus being coupled to said panel and configured for melting ice and snow positioned upon the corresponding wheel, said heating apparatus comprising an exterior wall being insulated,
wherein said heating apparatus including a heating element being mounted within said panel, said heating element comprising copper mesh,
a power supply being electrically coupled to said heating element, said power supply comprising a battery being removably stored within a compartment attached to said panel.

2. The vehicle wheel well heating system of claim 1, wherein said panel having a rectangular shape including a first edge, a second edge, and a pair of side edges, said panel comprising an elastomeric material being liquid impermeable and resiliently bendable to conform to a shape of the corresponding wheel well.

3. The vehicle wheel well heating system of claim 2, further comprising a plurality of tabs, each of said side edges having at least two of said tabs attached thereto, each of said tabs having an aperture extending therethrough, a plurality of fasteners, each of said tabs having one of said fasteners extending therethrough and into said car body, each of said fasteners comprising a screw insertable through said aperture of each of said tabs.

4. The vehicle wheel well heating system of claim 1, further comprising an actuator being in electric communication with said power supply for turning the heating element on or off, said actuator being mounted on an exterior of said panel, said actuator being a push button.

5. The vehicle wheel well heating system of claim 4, further comprising a circuit board being electrically coupled to said power supply and said actuator.

6. The vehicle wheel well heating system of claim 5, further comprising a transmitter being electrically coupled to said circuit board, said transmitter being in wireless communication with said remotely positioned control to remotely actuate said heating element.

7. A vehicle wheel well heating system comprising:
a vehicle configured for transporting a user, said vehicle comprising:
  a car body including a plurality wheel wells; and
  a plurality of wheels being coupled said car body, each of said wheels being positioned in one of said wheel wells;
a plurality of heating assemblies, each of said wheel wells having one of said heating assemblies mounted therein, each of said heating assemblies being configured for actuating remotely by a remotely positioned control and retaining a temperature of an associated one of said wheel wells above 0° C. to inhibit snow and ice from building up in the wheel well and on a corresponding one of the wheels, each of said heating assemblies including:
  a panel being coupled to the associated one of said wheel wells and being proximate to the corresponding one of said wheels, said panel having a rectangular shape including a first edge, a second edge, and a pair of side edges, said panel comprising an elastomeric material being liquid impermeable and resiliently bendable to conform to a shape of the corresponding wheel well;

a plurality of tabs, each of said side edges having at least two of said tabs attached thereto, each of said tabs having an aperture extending therethrough;

a plurality of fasteners, each of said tabs having one of said fasteners extending therethrough and into said car body, each of said fasteners comprising a screw insertable through said aperture of each of said tabs;

a heating apparatus being coupled to said panel and configured for melting ice and snow positioned upon the corresponding wheel, said heating apparatus comprising an exterior wall being insulated, said heating apparatus including:

a heating element being mounted within said panel, said heating element comprising copper mesh;

a power supply being electrically coupled to said heating element, said power supply comprising a battery being removably stored within a compartment attached to said panel;

an actuator being in electric communication with said power supply for turning the heating element on or off, said actuator being mounted on an exterior of said panel, said actuator being a push button;

a circuit board being electrically coupled to said power supply and said actuator; and a transmitter being electrically coupled to said circuit board, said transmitter being in wireless communication with said remotely positioned control to remotely actuate said heating element.

* * * * *